United States Patent
Mayer et al.

(10) Patent No.: US 11,863,116 B2
(45) Date of Patent: Jan. 2, 2024

(54) FLOATING SOLAR PHOTOVOLTAIC ARRAY WITH ON-BOARD ENERGY MANAGEMENT SYSTEM FOR CONTROLLING AND POWERING INFLATABLE SUPPORT PONTOONS, WATER QUALITY, AIR COMPRESSION AND MOORING DEVICES

(71) Applicant: NORIA ENERGY, Sausalito, CA (US)

(72) Inventors: Alex Mayer, Mill Valley, CA (US); James Raiford, San Francisco, CA (US)

(73) Assignee: NORIA ENERGY, Sausalito, CA (US)

( * ) Notice: Subject to any disclaimer, the term of this patent is extended or adjusted under 35 U.S.C. 154(b) by 64 days.

(21) Appl. No.: 18/303,381

(22) Filed: Apr. 19, 2023

(65) Prior Publication Data
US 2023/0261605 A1     Aug. 17, 2023

Related U.S. Application Data

(63) Continuation of application No. 17/714,888, filed on Apr. 6, 2022, now Pat. No. 11,664,760.
(Continued)

(51) Int. Cl.
*H02S 10/40*     (2014.01)
*H02J 3/38*      (2006.01)
(Continued)

(52) U.S. Cl.
CPC .............. *H02S 10/40* (2014.12); *B63B 7/082* (2013.01); *B63B 35/38* (2013.01); *B63B 35/44* (2013.01);
(Continued)

(58) Field of Classification Search
CPC .......... H02S 10/40; H02S 40/32; H02S 40/38; B63B 79/10; B63B 7/082; B63B 35/38;
(Continued)

(56) References Cited

U.S. PATENT DOCUMENTS

| 4,906,359 A | 3/1990 | Cox, Jr. |
| 7,670,044 B2 | 3/2010 | Tormaschy et al. |

(Continued)

FOREIGN PATENT DOCUMENTS

| KR | 101162473 B1 | 7/2012 |
| WO | 2018055469 A1 | 3/2018 |

(Continued)

OTHER PUBLICATIONS

Sungrow, To Be the Reliable FPV System & Solution Supplier brochure, 2021-2022, 11 pages.
United States International Searching Authority, International Search Report and Written Opinion for corresponding International Application No. PCT/US2022/023719, dated Aug. 30, 2022, 11 pages.

*Primary Examiner* — Robert L Deberadinis
(74) *Attorney, Agent, or Firm* — David R. Heckadon; Gordon Rees Scully Mansukhani LLP

(57) ABSTRACT

A floating solar photovoltaic array having an energy management power control system configured to send power clipped by an inverter to the at least one powered accessory device which can be an aerator, a diffuser, a sub-surface agitator, a sub-surface water circulator, a sub-surface positioning/mooring system, a water quality sensor; a panel washer, or a bird removal system. The array has inflatable pontoons and an air manifold system which is powered by the solar photovoltaic modules can be used to adjust the angle of inclination of the solar photovoltaic modules to the sun. The powered accessories can also be powered by unclipped power or on-shore power or combinations thereof which can be controllably adjusted by the energy management control system over time.

13 Claims, 17 Drawing Sheets

Related U.S. Application Data

(60) Provisional application No. 63/171,981, filed on Apr. 7, 2021, provisional application No. 63/179,925, filed on Apr. 26, 2021.

(51) Int. Cl.
| | | |
|---|---|---|
| *B63B 7/08* | (2020.01) | |
| *H02S 40/32* | (2014.01) | |
| *H02S 40/38* | (2014.01) | |
| *B63B 35/38* | (2006.01) | |
| *B63B 79/10* | (2020.01) | |
| *B63B 35/44* | (2006.01) | |

(52) U.S. Cl.
CPC .............. *B63B 79/10* (2020.01); *H02J 3/381* (2013.01); *H02S 40/32* (2014.12); *H02S 40/38* (2014.12); *B63B 2035/4453* (2013.01); *H02J 2300/24* (2020.01)

(58) Field of Classification Search
CPC ... B63B 35/44; B63B 2035/4453; B63B 7/08; H02J 3/381; H02J 3/38; H02J 2300/24
See application file for complete search history.

(56) References Cited

U.S. PATENT DOCUMENTS

| | | |
|---|---|---|
| 7,891,351 B2 | 2/2011 | Hinderling et al. |
| 10,022,688 B2 | 7/2018 | Keeton, Jr. |
| 10,843,140 B2 | 11/2020 | Burton et al. |
| 11,117,106 B2 | 9/2021 | Li et al. |
| 2002/0104807 A1 | 8/2002 | Keeton, Jr. |
| 2007/0234945 A1 | 10/2007 | Khouri et al. |
| 2014/0100698 A1 | 4/2014 | Suresh et al. |
| 2017/0310272 A1 | 10/2017 | Julian et al. |
| 2018/0034408 A1 | 2/2018 | Julian et al. |
| 2018/0329382 A1 | 11/2018 | Somani et al. |
| 2019/0341880 A1 | 11/2019 | Wang et al. |
| 2020/0324260 A1 | 10/2020 | Li et al. |
| 2021/0214056 A1 | 7/2021 | Harrison et al. |

FOREIGN PATENT DOCUMENTS

| | | |
|---|---|---|
| WO | 2018055470 A1 | 3/2018 |
| WO | 2018055471 A1 | 3/2018 |
| WO | 2018055585 A1 | 3/2018 |
| WO | 2018134779 A2 | 7/2018 |

DAILY OPERATION

Continuous Operation

On-Demand Operation

FLOATING SOLAR PHOTOVOLTAIC ARRAY WITH ON-BOARD ENERGY MANAGEMENT SYSTEM FOR CONTROLLING AND POWERING INFLATABLE SUPPORT PONTOONS, WATER QUALITY, AIR COMPRESSION AND MOORING DEVICES

CROSS-REFERENCES TO RELATED APPLICATIONS

This is a Continuation of U.S. patent application Ser. No. 17/714,888, of same title, filed Apr. 6, 2022, which claims priority to U.S. Provisional Patent Application Ser. No. 63/171,981, entitled System for Facile Integration of Water Quality Control Devices into Floating Solar Systems, filed Apr. 7, 2021, and to U.S. Provisional Patent Application Ser. No. 63/179,925, entitled Module Float Design Feature that Reduces External Hardware Requirements for Mounting Modules to Structures in Floating Solar Systems, filed Apr. 26, 2021, the entire disclosures of which are incorporated herein by reference in their entireties for all purposes.

TECHNICAL FILED

The present system relates to floating solar photovoltaic (PV) arrays.

BACKGROUND OF THE INVENTION

Currently, one challenge that can affects the adoption of floating solar PV arrays is that they have unknown impacts to water quality. While floating solar arrays have been claimed to provide passive benefits to their host water bodies, including reduced evaporation and algae growth, there is still a large gap in knowledge about the extent of impact. What is desired is a floating solar PV array that includes systems that remediate or improve water quality. Ideally, such a system would also measure and regulate important water quality parameters. As will be shown, the present system can achieve these objectives.

Secondly, although water remediation systems including aerators and diffusers have been used in conjunction with floating solar arrays in the past, powering these remediation systems is expensive and presents some challenges. The standard method for running these remediation systems is simply to run a power line or compressed air supply line from the shore out to the solar array as the power or air source for these water remediation devices. In this configuration, the floating solar PV array and water accessory devices are decoupled from and electrical and controls standpoint. What is instead desired is a system that can use the power that is already being generated by the solar PV array to power these various water quality remediation devices. This desired system that integrates the floating solar PV array and water accessories can reduce the cost of water management for water body operators. Since the power generated by the array changes over the course of the day (and is basically not available at night), an ideal solution would also balance power inputs from the array itself and from the on-shore grid to operate the various water quality remediation devices at the specific times (and in the specific amounts) that they are needed. In addition, an ideal system would also use the power generated by the PV modules that is normally clipped by the inverter to power these various water quality remediation devices. This use of inverter-clipped power has not been achieved in the past. Ideally, such an on-board power management system would use the inverter-clipped power, but also be able to supplement this power with non-clipped power or even on-shore power as required to run the various water quality remediation devices (and other devices) at different times and during changing environmental and power generating conditions. As will be shown, the present system addresses these challenges and overcomes them.

Another one of the biggest challenges with floating solar PV arrays in general is their high costs (as compared to land-based solar PV arrays). This is due to several factors. First, floating components tend to be quite specialized for use on the water, and are therefore somewhat expensive. Second, it can be expensive to ship these specialized components to the body of water on which they will be assembled and deployed. Third, additional costs are also incurred in the actual assembly of floating solar arrays, which are more challenging to build than land-based arrays as standard installation practices are still being defined. Finally, floating solar arrays are also more expensive to maintain as the operator needs to come out on the water to access the array.

What is instead desired is a floating solar PV array that offers reduced costs as compared to existing floating systems. First, it would be desirable to reduce the costs of the various components themselves. As such, it would also be desirable to reduce the size and weight of these components (to reduce their shipping costs). Finally, it would be desirable to provide a floating solar PV array that is fast and easy to assemble (such that assembly times and associated labor costs are reduced). As will be shown herein, the present system achieves these objectives by providing an inexpensive and lightweight system. The present system can be compacted when shipped and assembled relatively easily and inexpensively. In addition, the present system uses relatively fewer components than are normally found in floating solar PV arrays to support the PV modules.

Another common problem with floating solar PV arrays is that it can be difficult to access all of their components after they have been assembled and deployed out on the body of water. As will be shown, the present system has design features that permit easy operator access to the various parts of the array while the array is floating on the body of water.

Another problem with floating solar PV arrays is that they typically do not move their PV module orientation to track the movement of the sun. As will be shown, the present system includes optional mechanisms that can move the PV modules both by adjusting their angle of tilt to the horizon and also optionally by rotating the array on the water's surface to track the movement of the sun. As such, multi-axes tracking of the sun can be achieved using the present system.

SUMMARY OF THE INVENTION

In preferred aspects, the present system includes a system for powering an accessory device with power generated on a floating solar photovoltaic (PV) array, comprising: a plurality of PV modules; a plurality of floating pontoons for supporting the PV modules above the water; an inverter for receiving DC power from the PV modules and converting the DC power to AC power, wherein the inverter has an AC power limit such that any power received above the AC Power limit would be clipped by the inverter; at least one powered accessory device; a power line running from the floating solar array to an on-shore grid; and an energy management power control system.

The energy management control system is configured to send power to at least one powered accessory device (which preferably includes a water remediation device, air compressor, mooring system or other device). The power sent to this accessory device includes power that has been clipped by the inverter. The advantage of this approach (i.e.: using inverter-clipped power to power the accessory device) is that it powers the accessory device with power that would otherwise be lost and not sent to shore. In optional aspects, however, the power sent to the accessory device can also include power that has not been clipped by the inverter. This approach includes sending power to the accessory device that could otherwise have been sent from the array directly to the on-shore power grid. This approach could be beneficial for short periods of time when it is necessary to have the powered accessory device turned on (for example, during extended water remediation), but when the inverter-clipped power is not sufficient all by itself to power the water remediation device. The present energy management control system thus balances (and varies) these two different sources of power over time. For example, some of the non-clipped power could be sent from the PV modules to keep an aerator on late in the day when the array's power output is lower (such that inverter-clipped power alone would not be able to keep the aerator running). In optional preferred aspects, the present energy management control system also is configured to receive power through a power line running from the floating solar array to the on-shore grid to send power to at least one powered accessory device. Again, this third source of power can be balanced and controlled over time. As a result, the present energy management power control system is configured to send power to at least one powered accessory device by adjustably changing the amounts of power received from each of the following power sources over a period of time: (i) power received from the PV modules that has been clipped by the inverter, (ii) power received from the PV modules that has not been clipped by the inverter, and (iii) power received from the on-shore grid. True, three-way power balancing can be achieved.

In preferred aspects, the powered water remediation accessory device is a water quality device, being one or more of an aerator, a diffuser, a sub-surface agitator, a sub-surface water circulator, or a water quality sensor. In other aspects, the powered accessory device is an air compressor for inflating the plurality of pontoons. In yet other aspects, the powered accessory device is a positional mooring device, a panel washer, or a bird removal system.

In various aspects, the present floating solar PV array comprises: (a) a plurality of inflatable upper support pontoons with upper mounting hardware thereon; (b) a plurality of lower support pontoons with lower mounting hardware thereon; and (c) a plurality of solar photovoltaic modules, wherein each solar photovoltaic module has an upper end that is connected to the mounting hardware on one of the inflatable upper support pontoons and a lower end that is connected to the mounting hardware on one of the lower support pontoons. The mounting hardware on the inflatable upper support pontoons is higher (i.e.: farther from the water) than the mounting hardware on the lower support pontoons to thereby hold each of the solar photovoltaic modules at an inclined angle to the water below. In addition, the mounting hardware of the present system involves a minimum of parts. In one embodiment, only hooks or module mounting feet are used to attach the ends of the PV modules to each of the upper and lower support pontoons.

The present system also comprises an air manifold system. As described herein, the air manifold system can include any air source. As such, the air source can include an air compressor or an air tank or a combination thereof. Pneumatic tubing is provided to connect the air source to each of the plurality of inflatable support pontoons. Pressure sensors are also preferably provided for determining air pressures in the inflatable support pontoons. An air manifold control system controls the air pressures in the inflatable support pontoons. Preferably, the entire air manifold system is powered by the photovoltaic modules in the solar photovoltaic array. As such, the present system can be fully self-contained in terms of sensing and maintaining its internal air pressures. This offers numerous benefits. For example, should air pressures fall in any of the support pontoons, the present system is able to detect the pressure drop and provide correction and re-inflate the support pontoons to within desired pressure ranges. A particularly unique advantage of the present self-contained pontoon inflation control system is that the pressures in the upper support pontoons can be changed to adjust the incident angle of the PV modules towards the sun. In addition, the upper support pontoons can be partially deflated to "stow" the system for safety reasons if the system is struck by adverse weather conditions.

An important advantage of the present system of upper and lower pontoons supporting the solar PV modules is that they substantially reduce the physical shipping volume of components in the array. Specifically, since the upper pontoons are inflatable, they are lightweight and can ideally be collapsed and packed tightly together during shipping. In various aspects, the lower pontoons may be inflatable as well, further reducing the shipping size and weight of the present system. In preferred embodiments, the upper support pontoons may simply be inflatable cylinders with mounting hardware attached directly thereto.

In preferred aspects, the inclined angle of each of the solar photovoltaic modules can be adjusted by adjusting an inflation level in the inflatable upper support pontoons. This advantageously provides the ability to track the sun's movement over the course of the day to optimize power generation in the array.

In preferred embodiments, the lower support pontoons may have a flattened top surface that functions as a walkway that supports the weight of an operator. This flattened top surface advantageously permits ease of access during both initial assembly on the water and for system maintenance thereafter.

In preferred aspects, the upper and lower support pontoons hold each of the solar PV modules above the water such that the center portion of each solar PV module is suspended directly above the water with no mechanical structures positioned directly underneath. As such, the solar PV modules are each simply suspended above the water with the only mechanical connection between any of the inflatable upper support pontoons and any of the lower support pontoons being through the solar photovoltaic module itself. The advantage of this design is that it substantially reduces the total amount of system support hardware. In fact, the mounting hardware on each of the inflatable upper support pontoons can simply include a U-ring connector thermally welded or adhesively connected to the inflatable upper support pontoon. In contrast, existing floating solar arrays tend to require many more fastening components.

In preferred aspects, the present system also includes a powered accessory which may be an aerator, a diffuser, a sub-surface agitator, a sub-surface water circulator, a sub-surface positioning/mooring system, a water quality sensor; a PV module panel washer, or even or a bird removal system, or some combination thereof. The advantage of aerators, diffusers, sub-surface agitators, sub-surface water circulators, and water quality sensors is that they can be used to improve water quality. The advantage of a sub-surface mooring system is that it can be used to keep the array at a preferred location, and to optionally rotate the array to track the movement of the sun across the sky. The advantages of panel washing or bird-removal systems are that they can be used to maximize power generation from the array. In all cases, these different powered accessories are preferably powered using inverter-clipped power from the PV modules in the array itself. As stated above, these various accessories may be completely powered by the array, or the array may power these accessories some of the time. The present energy management control system determines which power source(s) are used at which times and in what amounts. The energy management control system also adjusts these various energy sources over time under changing conditions. As such, the energy management control system can supply power generated by the PV modules in the array (including both inverter-clipped power and power that has not been clipped by the inverter) together with optional power sources including an on-board battery, or a power connection line to the on-shore grid, or both. In most preferred aspects, and during most of the time, the powered accessory can advantageously be powered by the output from the solar PV modules that has been clipped by an inverter. As such, the accessories can be powered from power that would otherwise be lost and not sent to shore.

A further advantage of the present system is that there is a wide variety of different configurations or layouts in which the system can be deployed. For example, the individual solar PV modules can be laid out in rows with all of the solar PV modules facing south. Alternatively, the solar PV modules can be laid out with alternating rows angled east and west. The individual solar PV modules can all be laid out in portrait orientation. Alternatively, however, the individual solar PV modules can all be laid out in landscape orientation.

In various preferred embodiments, the present solar PV array can have different numbers of upper and lower support pontoons in different configurations. For example, in various arrangements, each of the solar PV modules can have their own dedicated upper support pontoon. Alternatively, two or more solar PV modules can share the same upper support pontoon. In addition, although several solar PV modules can be mounted to the same lower support pontoon, the width of the present array can be extended by linking together more than one lower support pontoon.

DETAILED DESCRIPTION OF THE DRAWINGS

Figure 1:
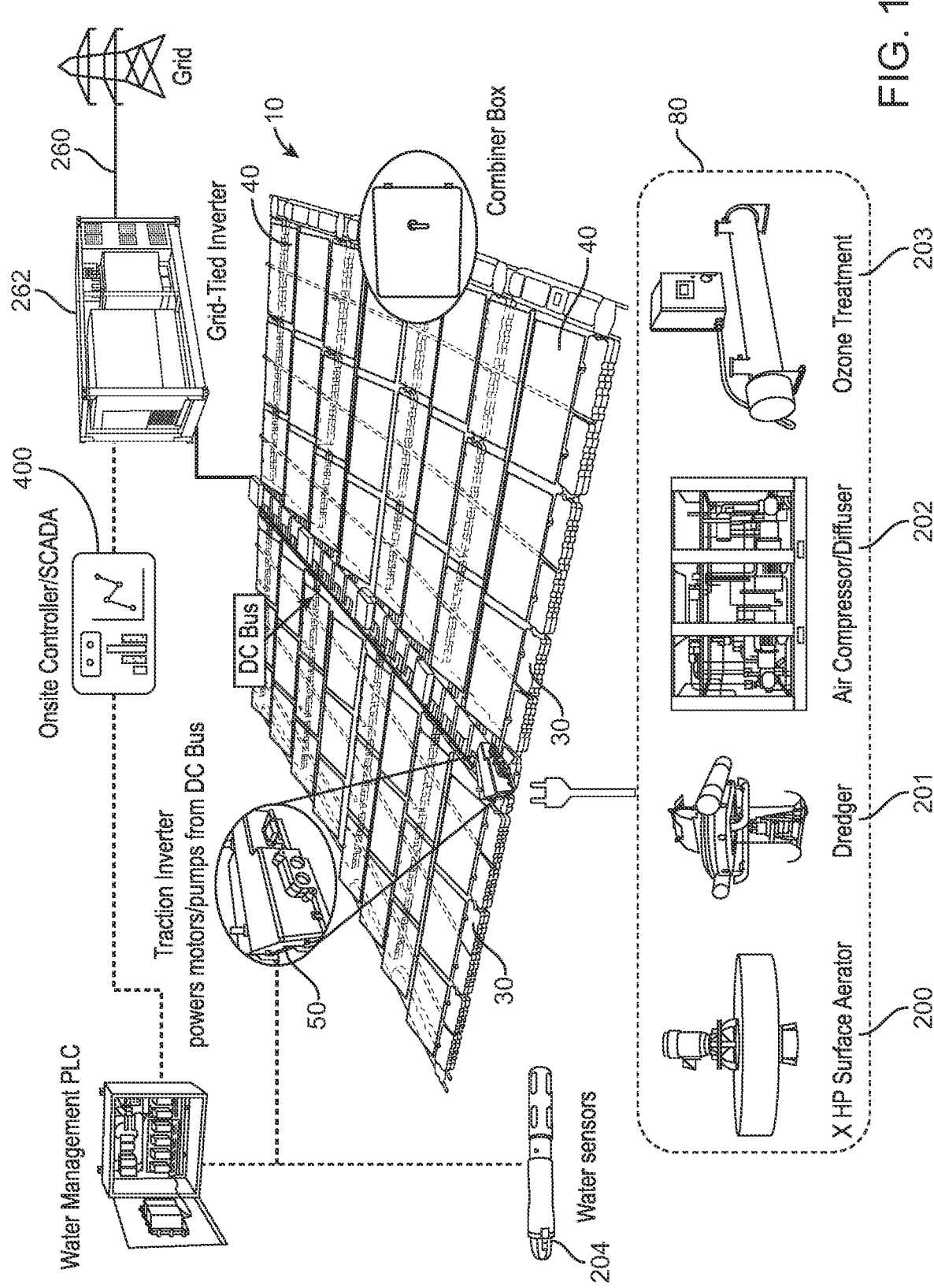
FIG. 1 is a perspective view of one embodiment of the present solar photovoltaic array.

FIGS. 1 to 4C show various embodiments of the present floating solar photovoltaic array 10, and its system of powering various accessory devices. In its various aspects, as seen in FIG. 1, the system comprises: a plurality of PV modules 40; a plurality of floating pontoons 30 for supporting PV modules 40 above the water; an inverter 50 or 262 for receiving DC power from PV modules 40 and converting the DC power to AC power. As will be explained, inverter 262 has an AC power limit such that any power received above the AC Power limit would be clipped by the inverter. Also included are at least one powered accessory device 80; a power 260 line running from the floating solar array 10 to an on-shore grid; and an energy management power control system 400 configured to send power that has been clipped by the inverter to the at least one powered accessory device 80.

In preferred aspects, energy management power control system 400 is further configured to send power that has not been clipped by the inverter to the at least one powered accessory device. In still further aspects, energy management power control system 400 is further configured to receive power through the power line 260 running from the floating solar array to the on-shore grid to send power to the at least one powered accessory device 80. As such, energy management power control system 400 can be configured to send power to the at least one powered accessory device 80 by adjustably changing the amounts of power received from each of the following power sources over a period of time: (i) power received from the PV modules that has been clipped by the inverter, (ii) power received from the PV modules that has not been clipped by the inverter, and (iii) power received from the on-shore grid.

Figure 4A:
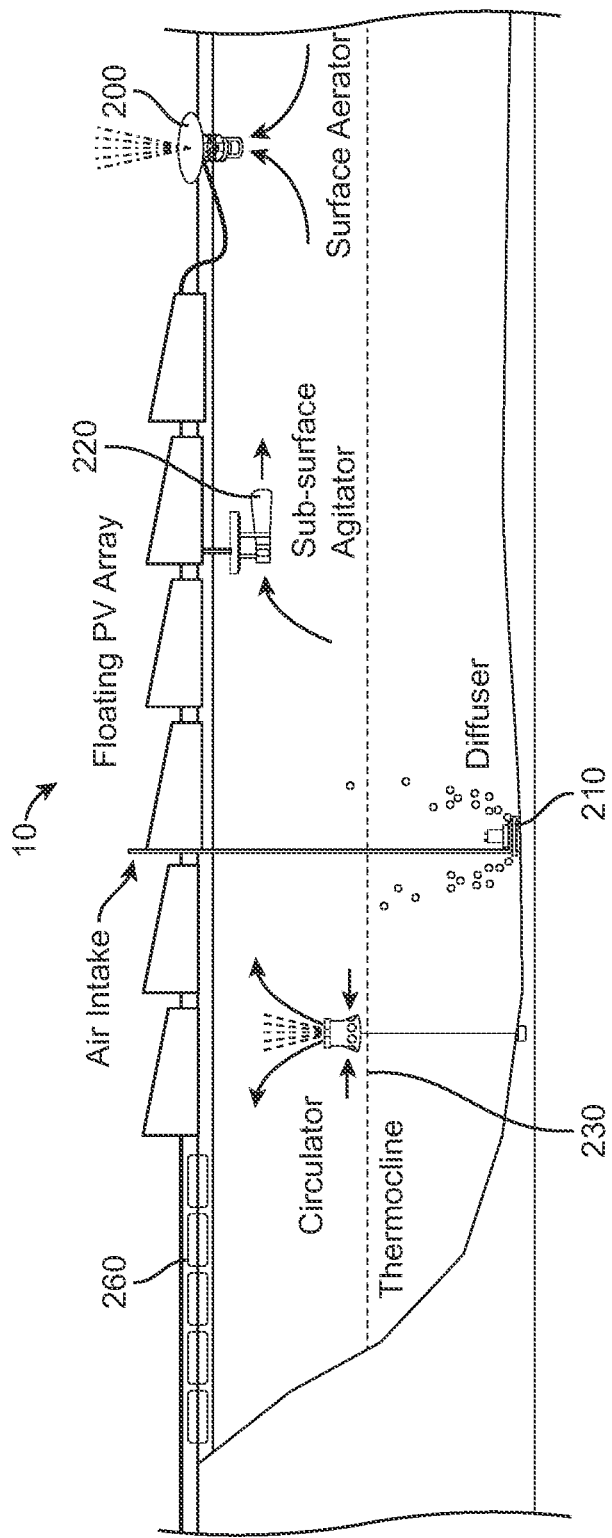
FIG. 4A is a side elevation view of an embodiment of the present solar PV array showing optional powered accessories including a surface aerator, a diffuser, sub-surface agitator, and a sub-surface water circulator.
Figure 4B:
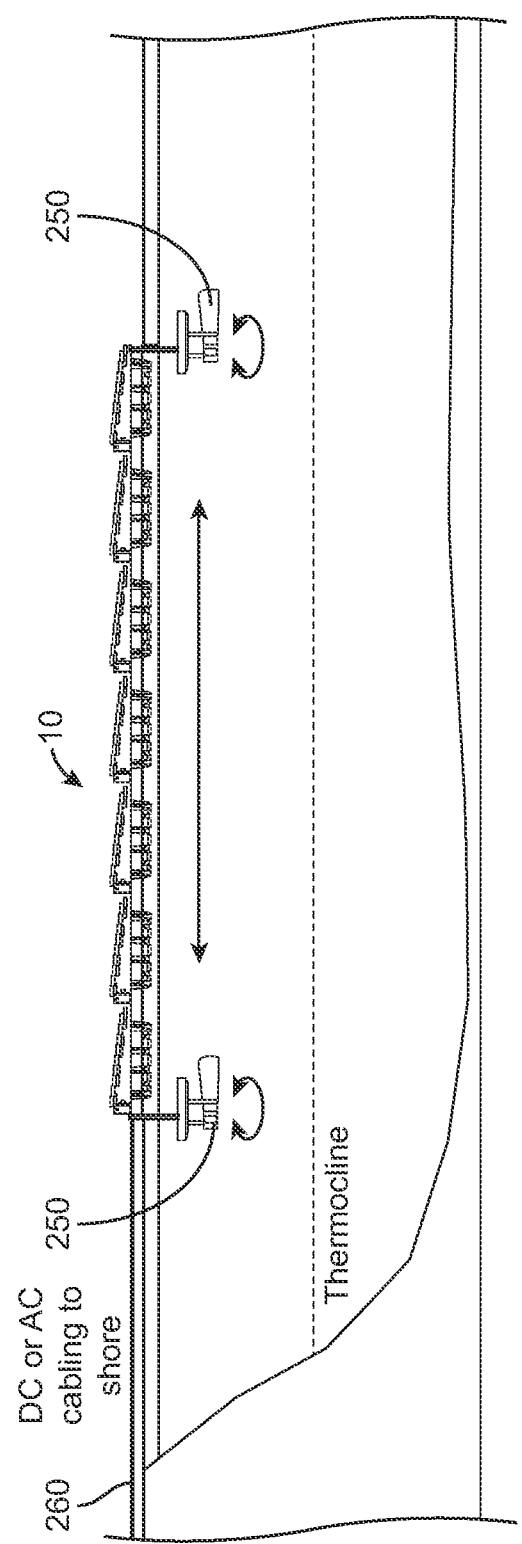
FIG. 4B is a side elevation view of an embodiment of the present solar PV array showing an optional sub-surface mooring system.
Figure 4C:
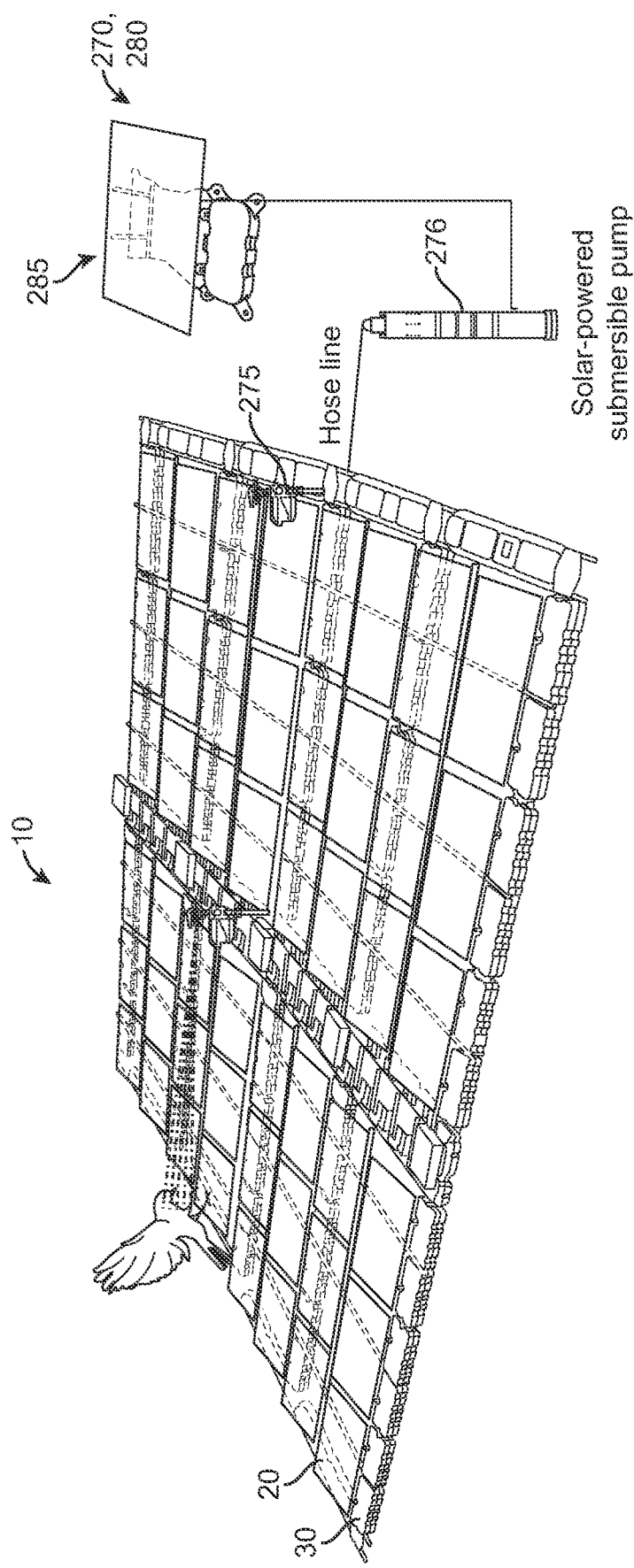
FIG. 4C is a perspective view of the solar PV array of FIG. 1, showing a panel washer and a bird removal system.

In various preferred aspects, powered accessory device 80 may be a water quality device including any one or more of the surface aerator 200, the dredger 201, the air compressor 202, the ozone treatment device 203 or the water sensor 204 illustrated in FIG. 1; or the aerator 200, diffuser 210, sub-surface agitator 220, or sub-surface water circulator 230 illustrated in FIG. 4A; the mooring/positional system 250 illustrated in FIG. 4B or the panel washer 270 or bird removal system 280 illustrated in FIG. 4C. As will be further explained, when the powered accessory 80 is air compressor 202, the air compressor can be used for inflating the plurality of pontoons. In optional embodiments, the powered accessory could also include debris collectors, UV treatment equipment, desalination equipment, or electrolyzers.

Figure 2A:
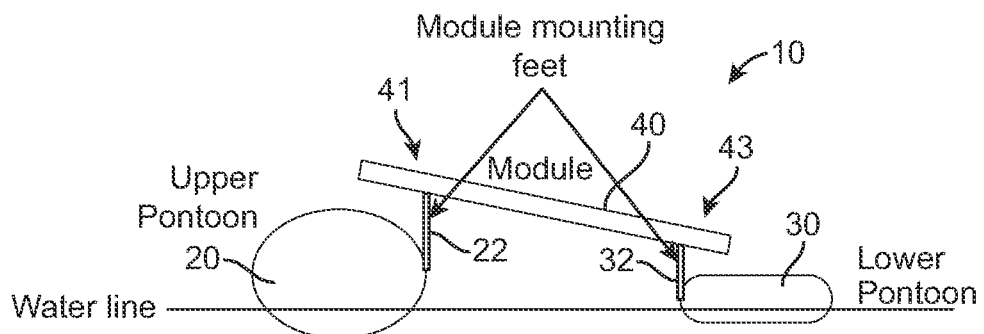
FIG. 2A is a side elevation view of a section of an embodiment of the present solar photovoltaic array in a south-facing orientation.
Figure 2B:
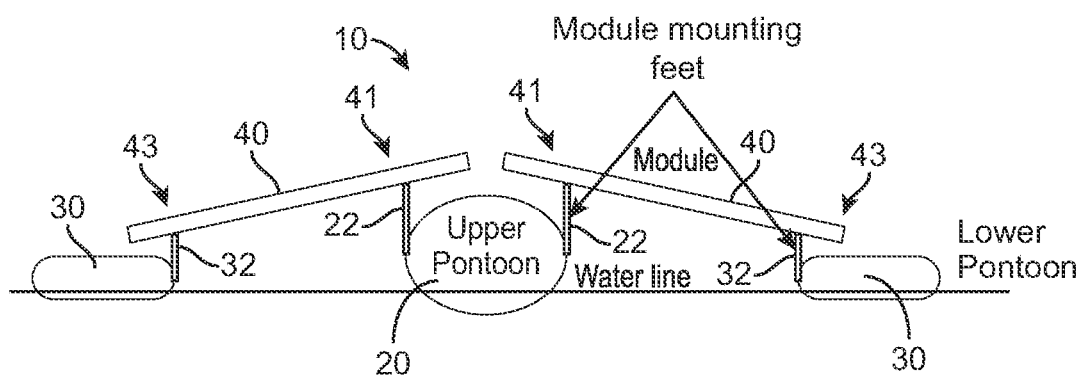
FIG. 2B is a side elevation view of a section of an embodiment of the present solar photovoltaic array in an east-west south-facing orientation.
Figure 3:
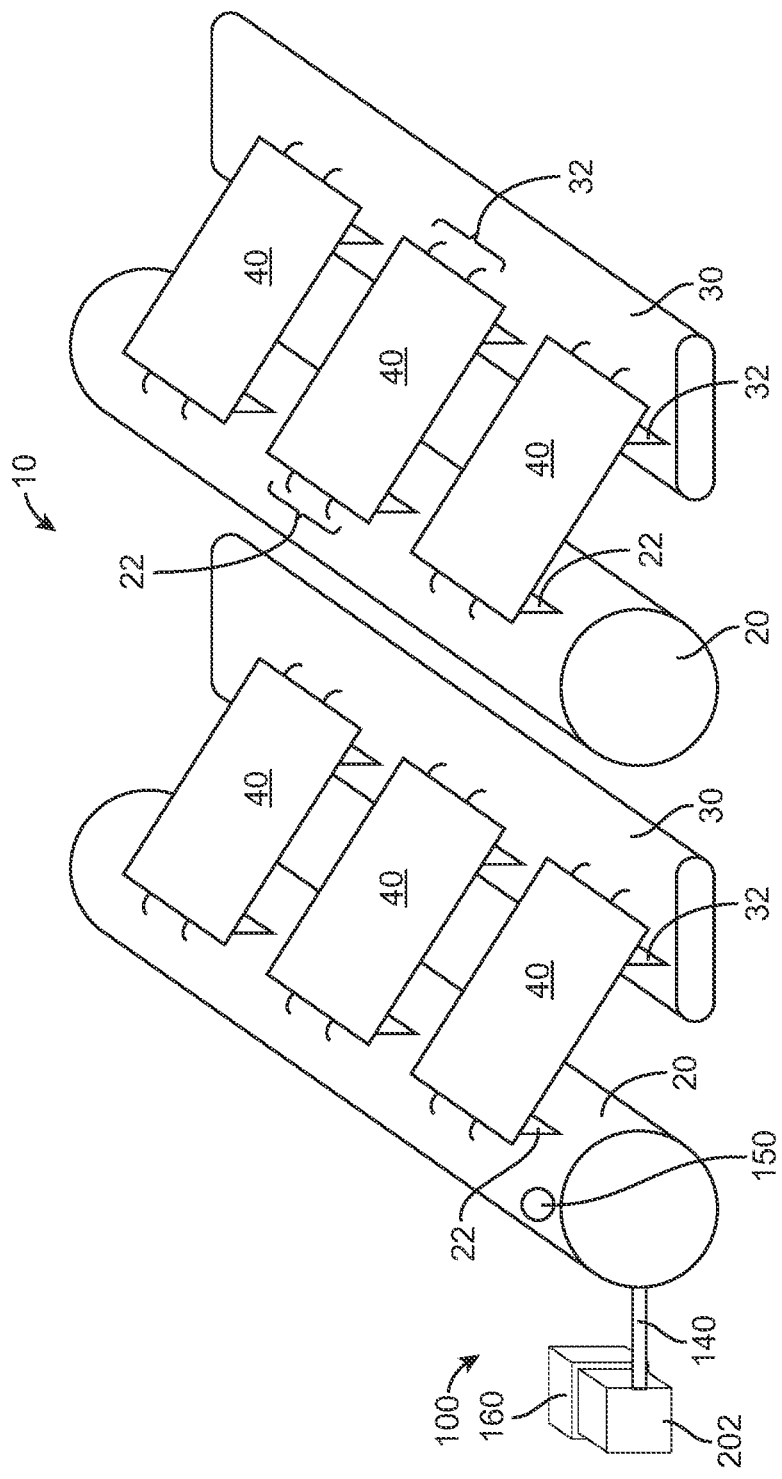
FIG. 3 is a simplified schematic perspective view of an array corresponding to FIG. 2A.

Turning next to FIGS. 2A to 3, various exemplary embodiments of the present array 10 are seen. It is to be understood that for clarity of understanding these figures are only simplified illustrations, and that not all structural components are illustrated.

FIG. 2A shows module 40 facing in a southward direction. In commercial embodiments, a plurality of the systems illustrated in FIG. 2A are positioned side by side (for example as seen in FIG. 3). FIG. 2B shows alternating rows of modules 40 facing in either an east or west direction. As seen in FIGS. 2A and 3, array 10 comprises: a plurality of inflatable upper support pontoons 20 with upper mounting hardware/mounts 22 thereon; a plurality of lower support pontoons 30 with lower mounting hardware/mounts 32 thereon; and a plurality of solar photovoltaic modules 40 mounted therebetween. As seen in FIG. 2B, two PV modules 40 may share the same upper support pontoon 20.

Each solar photovoltaic module 40 has an upper end 41 that is connected to the mounting hardware/mounts 22 on one of the inflatable upper support pontoons 20 and a lower end 43 that is connected to the mounting hardware/mounts 32 on one of the lower support pontoons 30. As can be seen, the mounting hardware/mounts 22 on inflatable upper support pontoon 20 is higher (i.e.: farther above the water) than the mounting hardware/mounts 32 on lower support pontoon 30. This preferred design holds each of the solar photovoltaic modules 40 at an inclined angle, as shown. In other embodiments, the mounting hardware 22 on each of the inflatable upper support pontoons 20 includes a U-ring connector thermally welded or adhesively connected to the inflatable upper support pontoon.

In preferred aspects, upper support pontoon 20 may be an inflatable cylindrical tube made of materials including, but not limited to, High Density Polyethylene (HDPE), Thermoplastic Olefin (TPO), Polyvinycl Chloride (PVC), Ethylene tetrafluoroethylene (ETFE), or a PVC-coated fabric. Preferably, upper support pontoons 20 have a thickness of between 50 um to 25 mm, or more preferably between 0.5 and 2.5 mm.

Lower support pontoons 30 may be made of similar materials and may also be inflatable. Also in preferred aspects, the lower support pontoons 30 have a flattened top surface 31 that can function as a walkway for operators to gain access to the PV modules. In optional aspects, a wire management chamber can be positioned on or in the lower support pontoons 30.

As explained above, the present array 10 also includes an air manifold system 100 (shown schematically in FIG. 3). System 100 preferably comprises an air compressor 202 (See FIG. 1) (or any other air source including an air tank), and pneumatic tubing 140 (see also FIGS. 10A to 10E) connecting air compressor 202 to each of the plurality of inflatable upper support pontoons 20. Pressure sensors 150 can be included for determining air pressures in each of the inflatable upper support pontoons 20. Lastly, an air manifold control system 160 can be used for measuring the output of pressure sensors 150 and controlling the air pressures in each of the inflatable upper support pontoons 20. Most preferably, air manifold system 100 is completely (or at least partially) powered by the photovoltaic modules 40 in the solar photovoltaic array.

In preferred aspects, the inclined angle of each of the solar photovoltaic modules 40 can be adjusted simply by adjusting an inflation level in one of the inflatable upper support pontoons 20. Specifically, as an upper support pontoon 20 is inflated, the top end 41 of a solar PV module 40 will be raised, thereby placing PV module 40 into a somewhat more vertical orientation. Conversely, deflating upper support pontoon 20 will place the PCV module 40 into a somewhat more horizontal orientation. Therefore, by changing the inflation pressures within upper support pontoons 20 over the course of a day, the angle of tile of the PV modules can be made to better track the motion of the sun.

As can be appreciated, the present floating mounting system uses substantially fewer components than traditional floating solar PV arrays. Instead, with the present system, so few components are required that the center portion of each solar photovoltaic module 40 can be positioned directly above water with no mechanical structure positioned directly thereunder (as seen in FIGS. 2A and 2B). As such, the only mechanical connection between any of the inflatable upper support pontoons and any of the lower support pontoons is through one of the solar photovoltaic modules.

Next, FIG. 4A illustrates the present solar PV array 10 showing a variety of optional powered accessories (e.g.: devices 80 in FIG. 1) that may be included therewith. Most preferably, these various powered accessories are powered by the PV modules 40 in the solar photovoltaic array. It is to be understood, however, that these powered accessories can be powered from a battery on the array (which may be recharged by the PV modules). As such, the powered accessory can be powered directly from the PV modules during the day and through the battery during the night (after the battery has been re-charged by the PV modules during the day).

In various aspects, the powered accessories can optionally include an aerator 200, a diffuser 210, sub-surface agitator 220, a sub-surface water circulator 230, and a water quality sensor (204 in FIG. 1). It is to be understood that the present system can include any number or combination of these accessories. Placing large, floating solar arrays onto bodies of water has the advantage of not requiring large amounts of terrestrial real estate for array deployment. Unfortunately, covering a comparatively large body of water with a floating solar array can have undesirable effects. For example, stratification of the water can be a problem. Floating solar arrays also interfere with natural wave motion and partially block the sun from reaching the water, thereby darkening the water below the array.

Accessories 200, 210, 220 and 230 (and 203 in FIG. 1) can be used to remediate or improve water quality, and water quality sensor (204 in FIG. 1) can be used for measuring water quality. For example, aerator 200 can be a floating surface fountain as illustrated that sprays water upwards. Diffuser 210 can be a bottom resting device that releases bubbles of air (i.e.: air is pumped air down in a tube from above the array and released underwater it so that it bubbles upwards). Both aerator 200 and diffuser 210 assist in aerating the water. Sub-surface agitator 230 can be a propeller/turbine device mounted to the underside of the array that stirs the water under array 10. Sub-surface water circulator 230 can be a bottom mounted propeller/turbine device that stirs the water under array 10. These powered accessories help repair stratified water bodies, prevent algae blooms, and support desired flora and fauna.

Ideally, accessories 200, 210, 220, 230 and 203 can be powered by PV modules 40, thereby permitting their operation during the daytime (when power is being generated by the array). Since accessories 200, 210, 220, 230 and 203 typically do not need to be operating 24 hours/day to provide benefits, it is possible to operate these accessories solely relying upon power generated from the PV modules 40. This provides a fully self-contained water quality remediation system. When water quality remediation devices such as these are integrated into the present solar array, installation costs are minimal. In addition, another advantage of using these powered accessories/water quality remediation devices is that it reduces the future costs of maintenance programs to reduce pond scum and toxic gasses. However, although these various devices may be powered solely by array 10, it is to be understood that the present system also encompasses variations with accessories 200, 210, 220 and 230 powered by PV modules 40, an on-board battery, a power line 260 running to shore or any combination thereof.

Figure 11A:
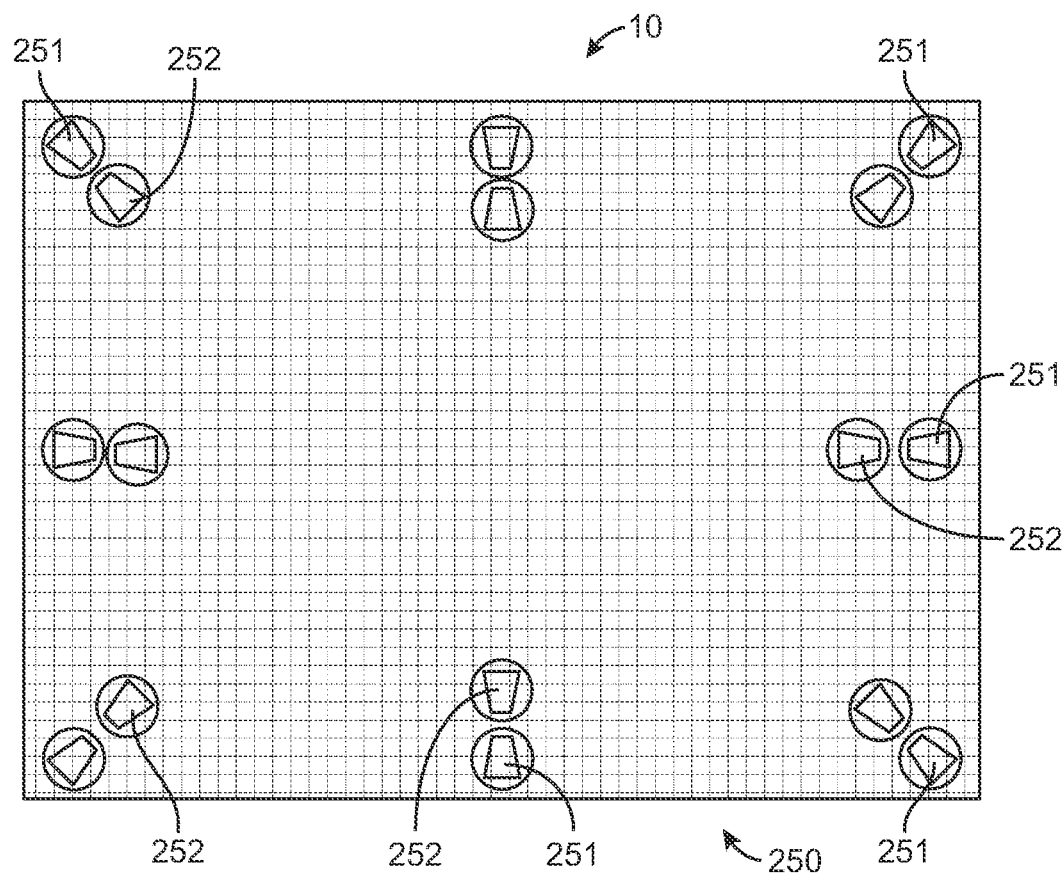
FIG. 11A is a bottom plan schematic view of an embodiment of the present floating solar PV array showing a sub-surface mooring/positioning system.
Figure 11B:
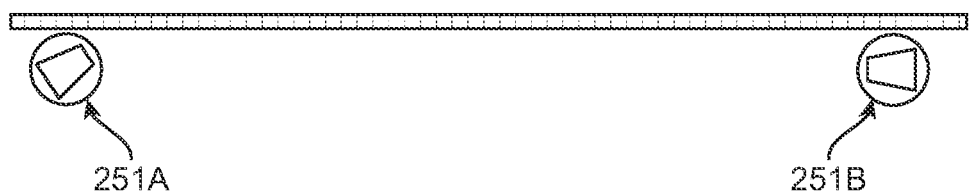
FIG. 11B is a side elevation view corresponding to FIG. 11A.

FIG. 4B is a side elevation view of the present solar PV array showing an optional sub-surface mooring/positioning system 250. Sub-surface mooring system 250 comprises a plurality of different propeller/turbines that move array 10 to a desired location (or keep array 10 at a desired location on the body of water). Although sub-surface positioning system 250 may be powered by PV modules 40, it is to be understood that its power may also be supplemented by an on-board battery or by a power line 260 running to shore (to power sub-surface positioning system 250 during the night). FIGS. 11A and 11B show another preferred embodiment of mooring system 250, as follows. In FIG. 11A, a plurality of separate turbine/propeller systems 251 and 252. Propellers 251 point outwardly from the bottom of array 10. Conversely, propellers 252 point inwardly under the bottom of array 10. By selectively turning on and off any of these propellers/turbines 251 and 252, it is possible to move the array 10 in any desired direction. This includes both moving the array to a desired location and keeping it there. For example, on a calm day, propellers/turbines 251 and 252 may be turned off. However, on a windy day, those propellers/turbines 251 and 252 that are pointing in a direction opposite to the wind may be turned on to keep the array in a desired position. Propellers/turbines 251 and 252 can also be selectively turned on and off to rotate array 10 on the body of water such that PV modules 40 can track the movement of the sun. The present system encompasses embodiments in which propellers/turbines 251 and 252 are individually steerable and embodiments where propellers/turbines 251 and 252 are operated at different intensities (for example, with a strong horizontal "pushback" on a windy day to keep the array at a desired location on the body of water, together with a smaller rotational "push" causing the array to rotate to track the sun over the course of the day).

As seen in FIG. 11B, propeller/turbines 251A in system 250 can be angled slightly downwards to further assist in keeping array 10 buoyant (as compared to more horizontal directed propeller/turbine 251B). In various aspects, the present system also includes a plurality of mooring cables connected to at least one of the plurality of inflatable upper support pontoons 20 or lower support pontoons 20 for mooring the array at a desired location on a body of water.

FIG. 4C is a perspective view of the present solar PV array 10 showing an optional panel washer 270 and an optional bird removal system 280. Panel washer system 270 may simply comprise a sprayer 275 than can be directed to suck up water from below the array (with submersible pump 276) and spray the water onto the surfaces of PV modules 40 to periodically clean the modules. Sprayer 275 can be automatically controlled to point in various directions to cover the surfaces of the different PV modules. The various cleaning routines can be programmed into the control system such that sprayer 275 sprays the surfaces of PV modules 40 one after another. Optional bird removal system 280 can function similar to panel washer 270. Specifically, bird removal system 280 suck up water from below the array and spray the water onto the surfaces of PV modules 40. However, the modules 40 are only sprayed when camera/motion sensor 285 detects a bird sitting on one of the PV modules 40. When a bird is viewed sitting on one of the PV modules, the sprayer 275 is aimed at the bird.

Figure 5:
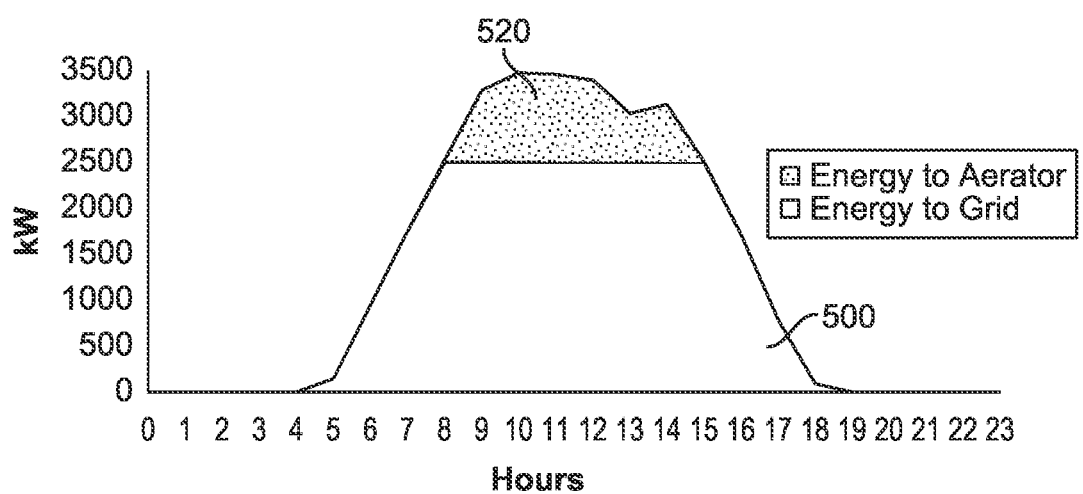
FIG. 5 is an exemplary graph of array power generated over time showing the portion of inverter-clipped power directed to the powered accessory.

FIG. 5 is an exemplary graph of array power generated over time showing the portion of inverter-clipped power directed to the powered accessory. Specifically, over a 24 hour period, power output from PV modules 40 peaks mid-day, and is zero overnight. However, in this example, the maximum power the inverter is able to send to the grid (via power line 260 to shore in FIG. 4A or 4B) is 2500 KW. Accordingly, the power in region 500 can be sent to the on-shore grid. However, the power in region 520 will be "clipped" by the inverter and cannot be sent to shore. Accordingly, in accordance with the present energy management power control system 400, the power in region 520 is instead sent directly to power an accessory 80 such as aerator 200. Accordingly, the aerator is operated between about 8 am and 3 pm. Should it be desirable to operate an accessory 80 at extended periods of time, energy management power control system 400 can use different power balancing approaches as explained in FIGS. 6A to 8B as follows.

Figure 6A:
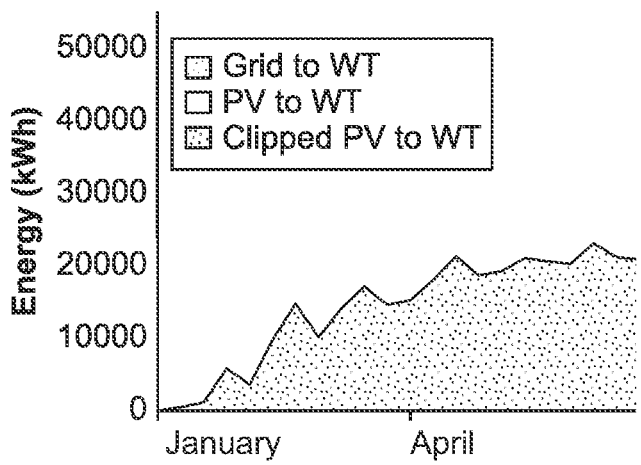
FIG. 6A is an exemplary graph showing inverter-clipped power sent to a powered accessory over a period of time.

FIG. 6A is an exemplary graph showing inverter-clipped power 520 sent to a powered accessory 80 over a period of time. In this illustration, accessory 80 will only be operated during daylight hours when inverter-clipped power 520 is available.

Figure 6B:
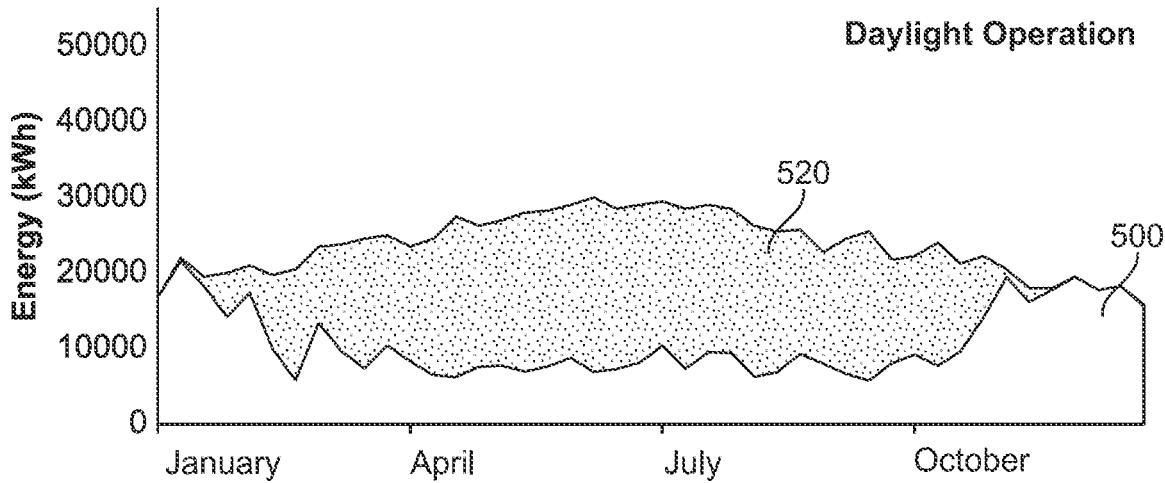
FIG. 6B is an exemplary graph showing the portions of both inverter-clipped power and power that has not been clipped by the inverter being sent to the powered accessory (or accessories) over a period of time.

FIG. 6B is an exemplary graph showing the portions of both inverter-clipped power 520 and power 500 that has not been clipped by the inverter being sent to the powered accessory (or accessories) 80 over a period of time. In this illustration, non-clipped power 500 is used at the end of the day to power accessory 80 when inverter-clipped power has tapered off.

Figure 6C:
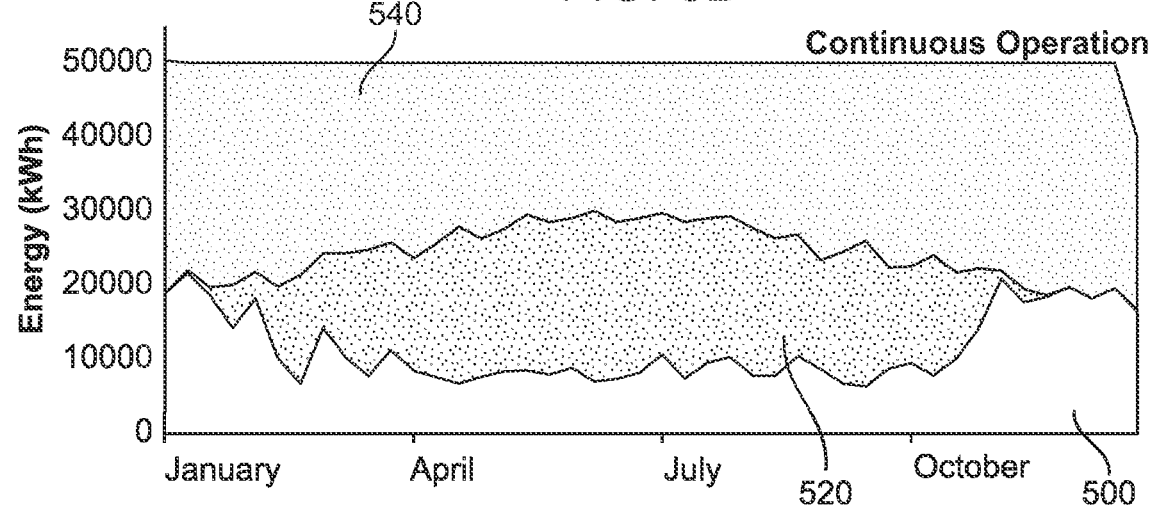
FIG. 6C is an exemplary graph showing the portions of inverter-clipped power, non-inverter-clipped power and shore-received power being sent to the powered accessory (or accessories) over a period of time.

Finally, FIG. 6C is an exemplary graph showing the portions of inverter-clipped power 520, non-inverter-clipped power 500 and shore-received power 540 all being sent to the powered accessory (or accessories) 80 over a period of time. This specific illustration is taken over a period of a full year and shows the situation where some power from the grid (i.e.: power 540) is used to power accessory 80 throughout the course of the year.

Figure 7A:
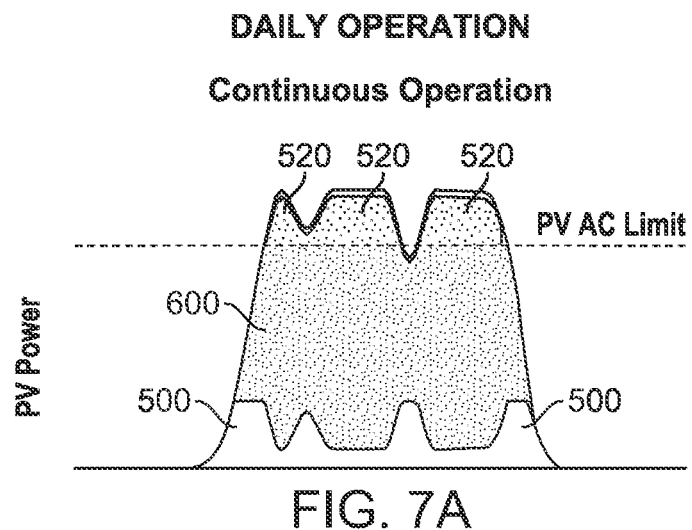
FIG. 7A is an exemplary graph showing various sources of power being generated by the solar PV array over a continuous 24 hour period.
Figure 7B:
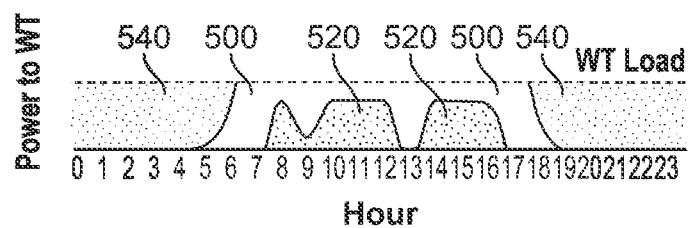
FIG. 7B shows the power being sent to the powered accessory (or accessories) corresponding to FIG. 7A during the continuous 24 hour period.

FIG. 7A is an exemplary graph showing various sources of power being generated by the solar PV array over a continuous 24 hour period. FIG. 7B shows the power being sent to the powered accessory (or accessories) corresponding to FIG. 7A during the continuous 24 hour period. Specifically, inverter-clipped power 520 is only sent to accessory 80 when such power is available (between about 6 am and 12 pm and 1 pm to 6 pm). Accordingly, power 500 (which has not been clipped by the inverter) will also be sent to accessory 80 from about 6 am to 6 pm such that the accessory has sufficient power for its operation (i.e.: such that the combined power regions 500 and 520 total the necessary power to run the device—identified as "WT Load" in FIG. 7B). Before 6 am and after 6 pm, the PV modules 40 won't be generating any power. Thus, power 540 will be drawing directly from the grid to keep the accessories running. As can be seen, the relative contributions of power regions/sources 500/520/540 will change over time. Early in the morning as the day starts, grid power 540 is phased out as non-clipped power 500 comes online. By mid-day, clipped power 520 starts to come online (as the PV modules 40 exceed the "PV AC Limit" seen in FIG. 7A), and the amount of non-clipped power 500 can be reduced. Later in the day, clipped power 520 starts to decrease until all power is supplied by non-clipped power source 500 (between about 5 pm and 6 pm). Finally, as non-clipped power source 500 starts to fall off, then grid power 540 will begin to take up the slack and will be the final sole power source overnight. Region 600 represents the power that array 10 supplies to the on-shore grid over the course of the day.

Figure 8A:
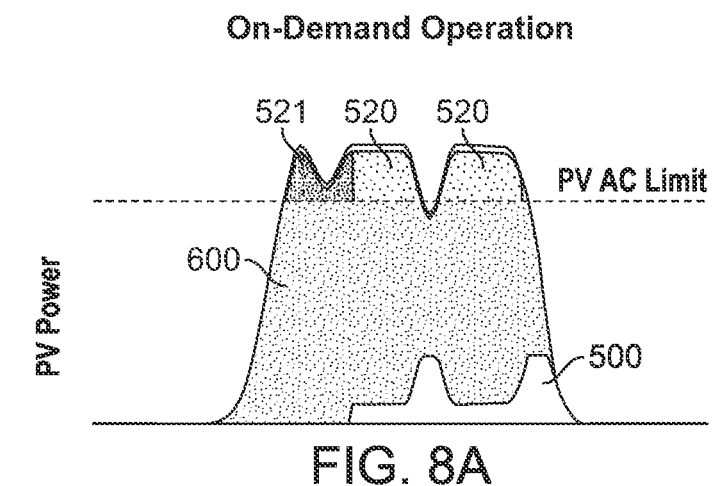
FIG. 8A is an exemplary graph showing various sources of power being generated by the solar PV array over a specific on-demand period of time.
Figure 8B:
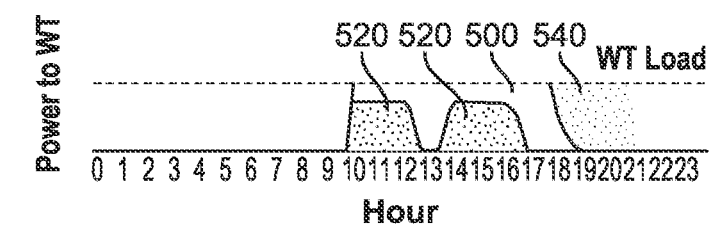
FIG. 8B shows the power being sent to the powered accessory (or accessories) corresponding to FIG. 8A during on-demand operation of the powered accessory (or accessories).

FIGS. 8A and 8B are similar to FIGS. 7A and 7B, however, FIGS. 8A and 8B deal with the situation where the powered accessory 80 need only be operated between about 10 am and 9 pm. Specifically, at around 10 am, power is supplied to the powered accessory from regions/sources 500 and 520. As can be seen, the relative proportions of these two amounts will vary somewhat over the course of the day. After about 6 pm, the powered accessory will rely solely upon grid-supplied power 540. At about 9 pm, the device 80 will be turned off and not turned on again until about 10 am the next morning. Power region 521 is "lost power" that has been clipped by the inverter but is not required to power accessory 80 at that particular time.

Figures 9A, 9B, 9C:
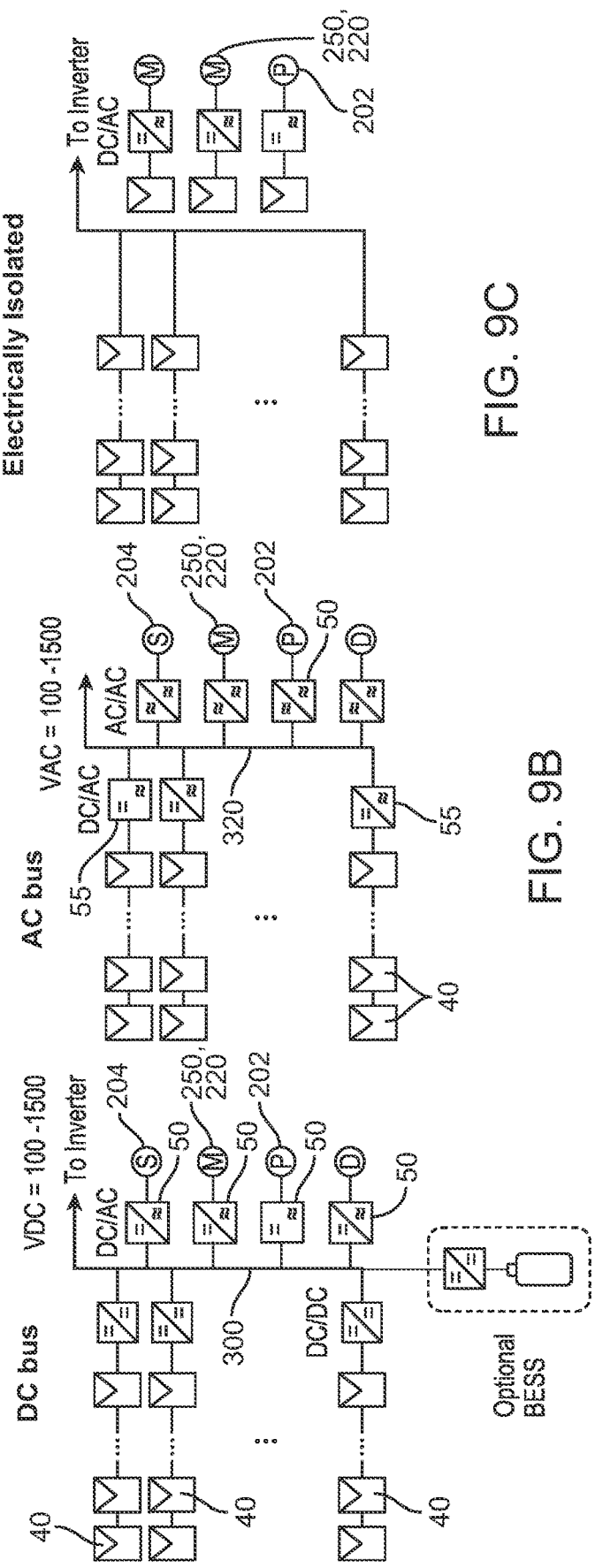
FIG. 9A is a schematic of powering the powered accessories using a DC bus.
FIG. 9B is a schematic of powering the powered accessories using an AC bus.
FIG. 9C is a schematic of powering the powered accessories using an electrically isolated system.

FIGS. 9A to 9C show different schematics of powering the powered accessories. Specifically, FIG. 9A shows powering using a DC bus; FIG. 9B shows powering using an AC bus; and FIG. 9C shows powering using an electrically isolated system.

In FIG. 9A, an on-shore inverter (262 in FIG. 1) converts DC output from the solar photovoltaic modules 40 into AC power, and a DC bus 300 sends the DC power to the on-shore inverter. Advantages of using DC Bus 300 include lower DC ohmic losses, and the ability to use clipped power 520 with a constrained AC connection more easily. In addition, voltage droop control can be used.

In FIG. 9B, a dedicated on-board inverter 55 converts DC output from each of the solar photovoltaic modules into AC power, and an AC bus 320 is connected to the inverter for sending AC power to shore. Advantages of using AC bus 300 include the fact that any type of solar inverter 55 can be used, and off-the-shelf VFDs and AC motor drives can be used to power the aerators.

Lastly, in FIG. 9C, an advantage of an electrically isolated system is that, again, any type of solar inverter can be used.

Figure 10A:
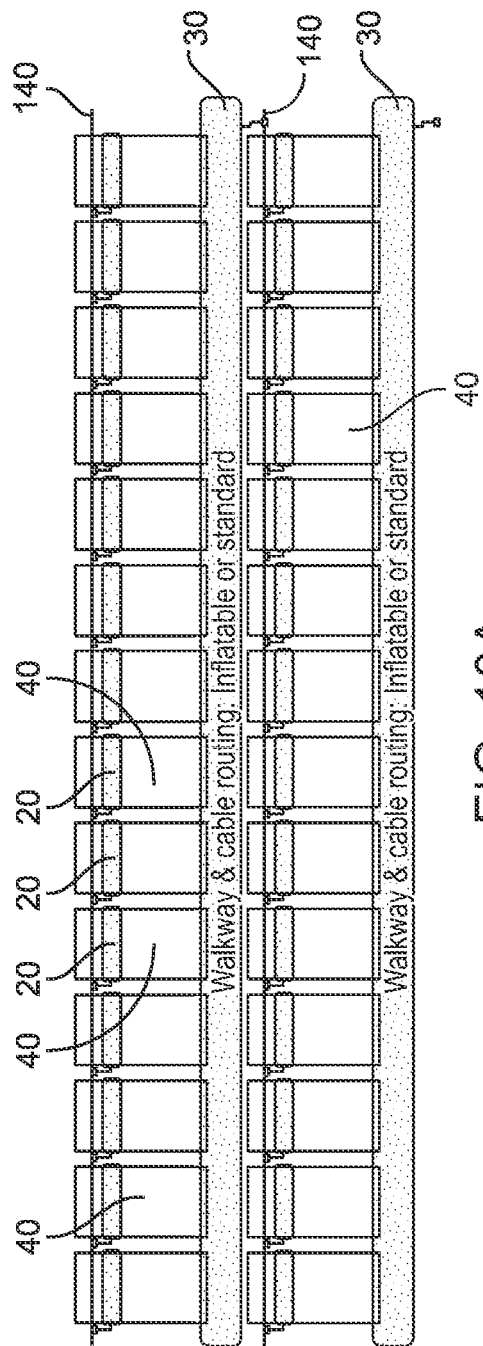
FIG. 10A is a top plan view of the present solar PV array laid out with the PV modules in a portrait, south facing orientation, with the PV modules each having a dedicated upper support pontoon.
Figure 10B:
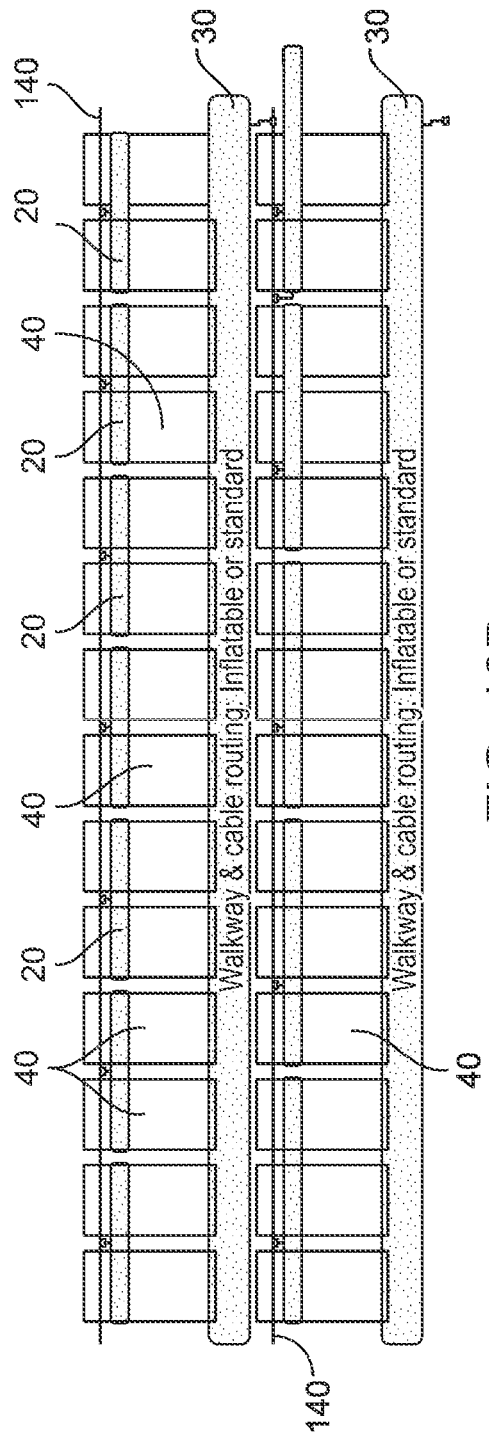
FIG. 10B is a top plan view of the present solar PV array laid out with the PV modules in a portrait, south facing orientation, with PV modules sharing upper support pontoons.
Figure 10C:
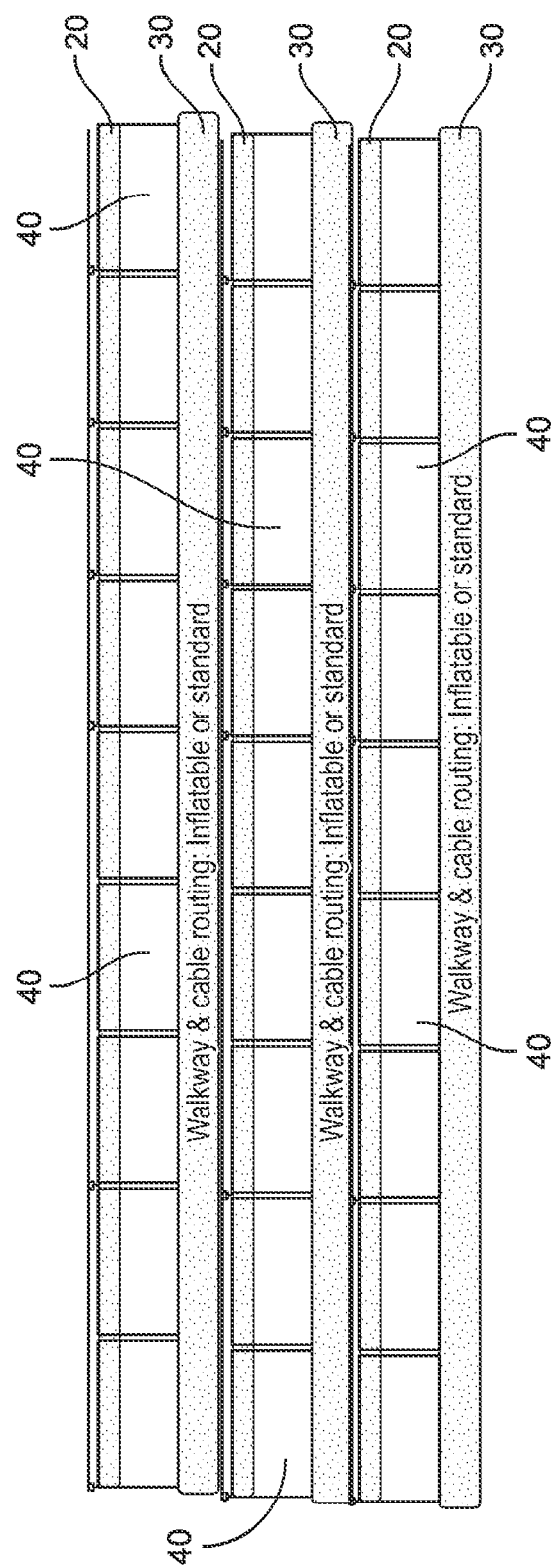
FIG. 10C is a top plan view of the present solar PV array laid out with the PV modules in a landscape, south facing orientation.
Figure 10D:
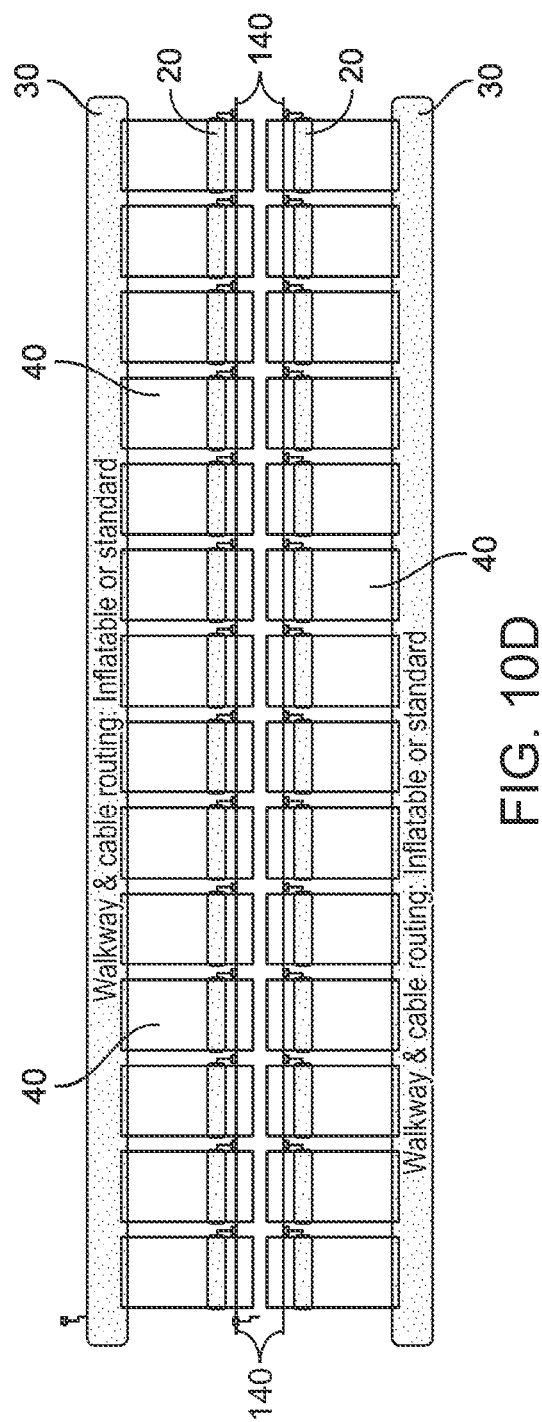
FIG. 10D is a top plan view of the present solar PV array laid out with the PV modules in a portrait, east-west facing orientation, with the PV modules each having a dedicated upper support pontoon.
Figure 10E:
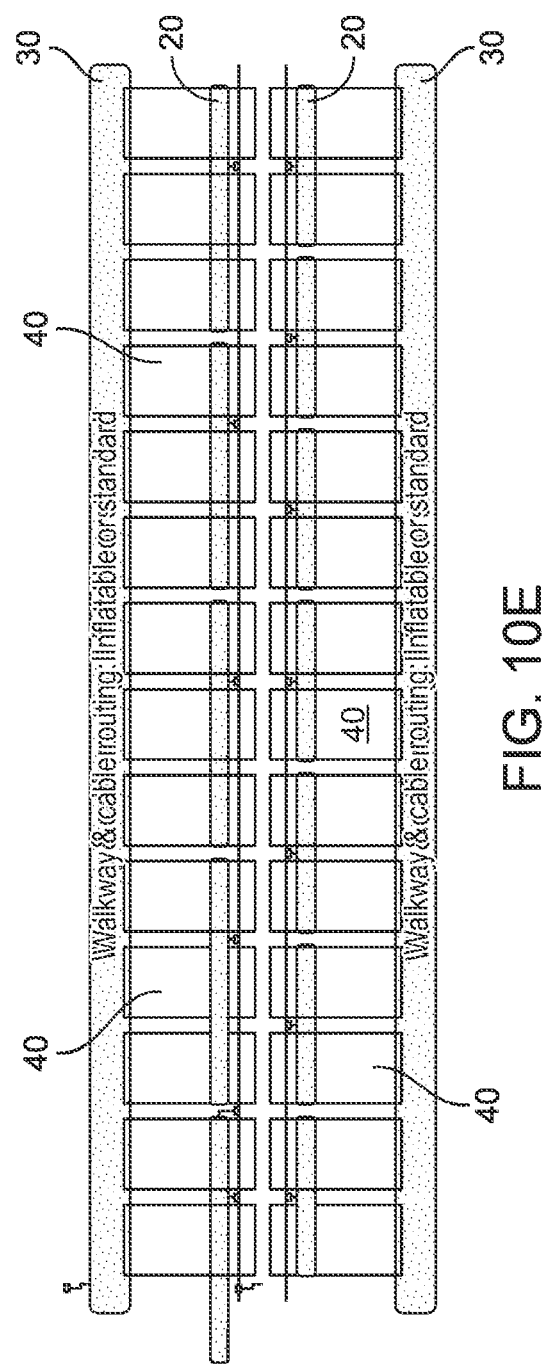
FIG. 10E is a top plan view of the present solar PV array laid out with the PV modules in a portrait, east-west facing orientation, with the PV modules sharing upper support pontoons.

Next, FIGS. 10A to 10E show various layouts of the PV modules 40 using the present floating mounting system. Specifically, FIG. 10A (which corresponds to FIGS. 2A and 3) shows PV modules 40 in a portrait, south facing orientation. As can be seen, each PV module 40 has its own dedicated upper support pontoon 20. FIG. 10B (which also corresponds to FIGS. 2A and 3) also shows the PV modules in a portrait, south facing orientation, but two PV modules 40 are sharing each upper support pontoon 20. FIG. 10C (which also corresponds to FIGS. 2A and 3) shows the PV modules 40 laid out in a landscape, south facing orientation. FIG. 10D (which corresponds to FIG. 2B) shows the PV modules 40 mounted in portrait, but laid out in in an east-west facing orientation. Specifically, a two rows of upper support pontoons 20 are next to one another. For a large array, two rows of lower support pontoons 30 would be positioned next to one another. As seen in FIG. 10D, each of the PV modules 40 have their own dedicated upper support pontoon 20. Lastly, FIG. 10E (which corresponds to FIG. 2B) shows PV modules 40 laid out in a portrait, east-west facing orientation, with the individual PV modules 40 sharing upper support pontoons 20. As can be appreciated, a wide variety of different array configurations are possible with the present system (depending upon where the successive rows of pontoons 20 and 30 are positioned, and whether the PV modules 40 are positioned in portrait or landscape).

Figure 12A:
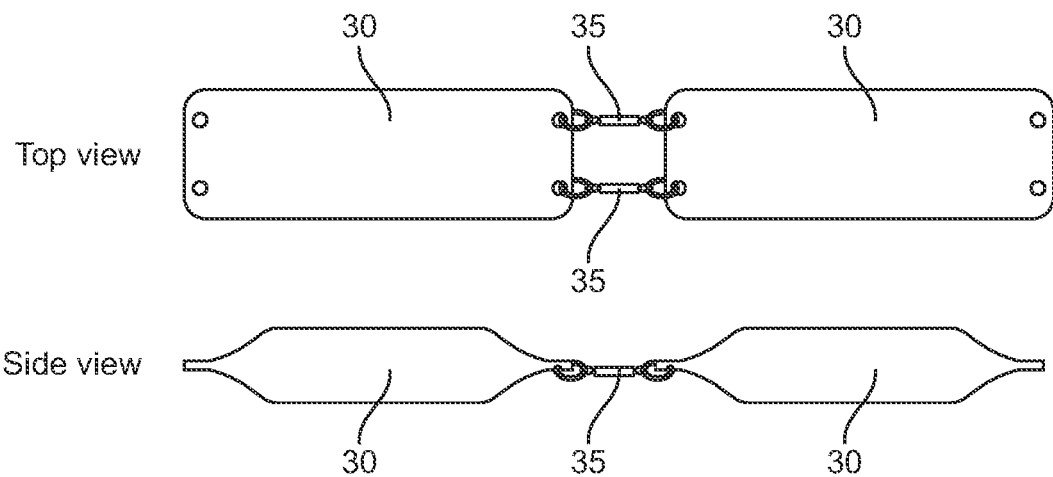
FIG. 12A shows top and side view of a first system for attaching two lower support pontoons together.
Figure 12B:
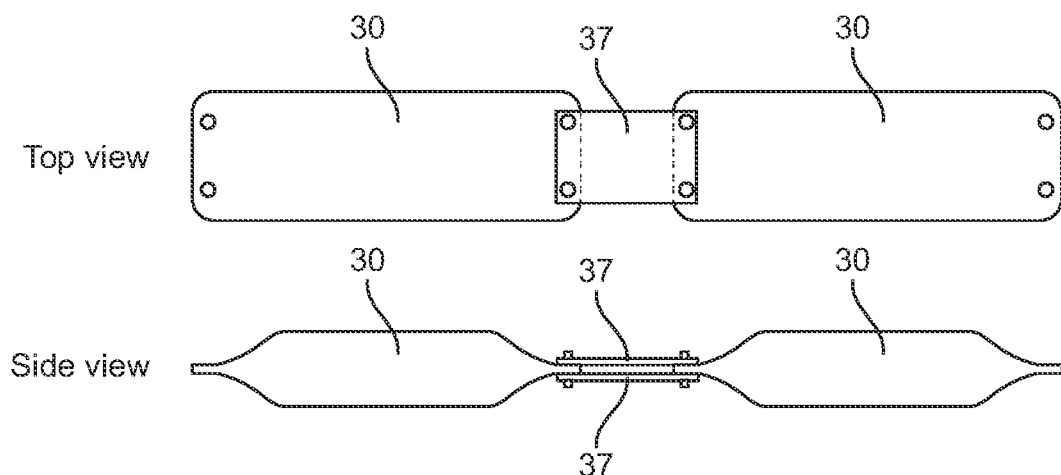
FIG. 12B shows top and side view of a second system for attaching two lower support pontoons together.
Figure 13:
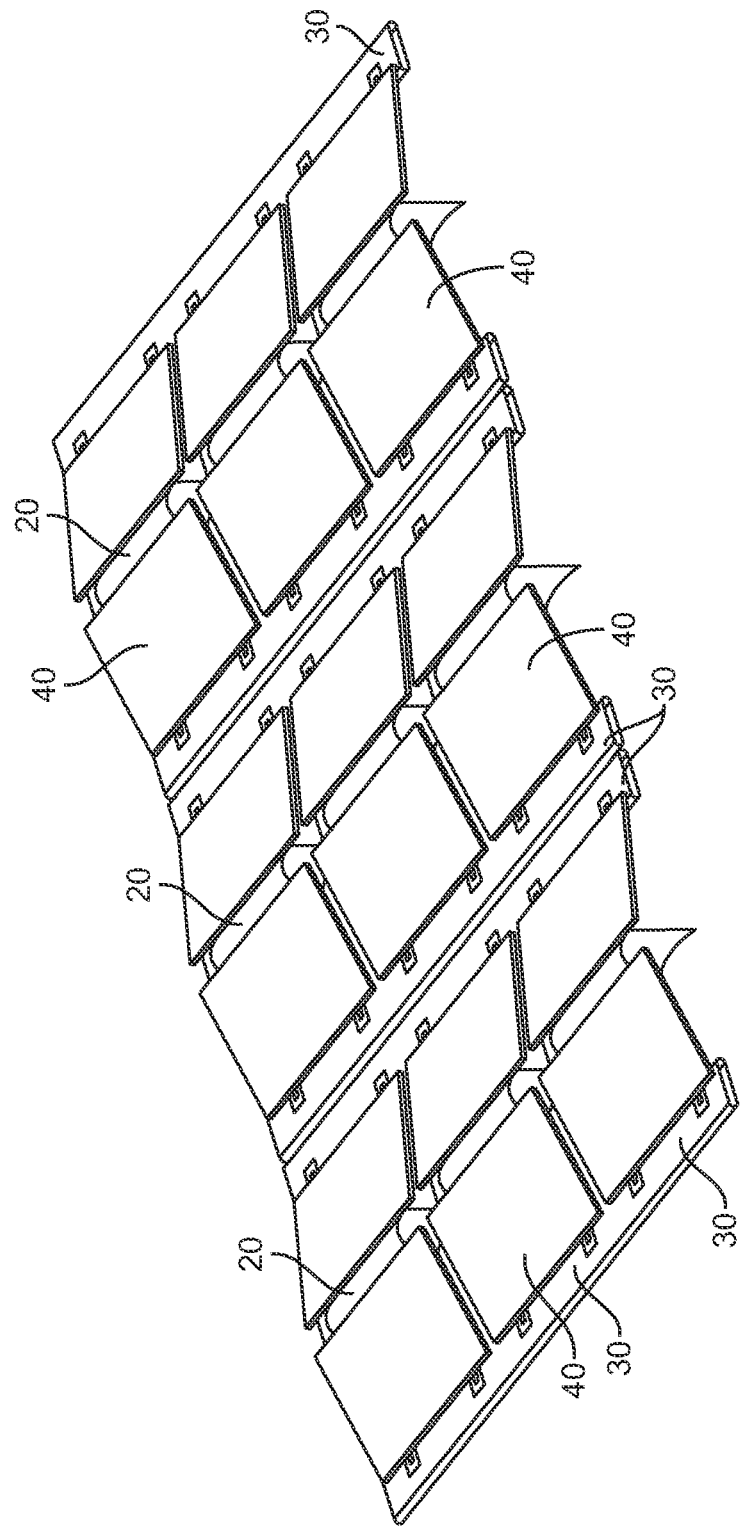
FIG. 13 is a view similar to FIG. 3, showing one preferred embodiment of the present floating solar PV array.

Finally, FIGS. 12A and 12B show various systems for attaching two lower support pontoons 30 together. Specifically, FIG. 12A shows top and side views of a system for attaching pontoons 30 together using elastic connectors 35. FIG. 12B shows top and side views of a system for attaching pontoons 30 together using mechanical plates 37.

What is claimed is:

1. A mooring system for a floating solar photovoltaic array, comprising:
    (a) a plurality of PV modules;
    (b) a plurality of floating pontoons for supporting the PV modules above the water; and
    (c) an array positioning system configured to perform each of the following:
        (i) rotate the array to track the movement of the sun,
        (ii) move the array in a straight direction across the surface of the water to a desired location, or (iii) maintain the position of the array at a desired location on the surface of the water when the array is subjected to forces from wind or waves.

2. The mooring system of claim 1, wherein the array positioning system comprises a plurality of motors with propellers attached to the floating solar photovoltaic array, the motors with propellers being positioned below the surface of the water.

3. The mooring system of claim 2, wherein the motors with propellers are attached to the floating solar photovoltaic array in pairs pointing in opposite directions.

4. The mooring system of claim 3, wherein some of the motors with propellers point inwardly towards the center of the array and some of the motors with propellers point outwardly away from the center of the array.

5. The mooring system of claim 3, where the motors are bi-directional.

6. The mooring system of claim 2, wherein the motors with propellers are mounted at side edges or corner edges of the array.

7. The mooring system of claim 2, wherein the motors with propellers are independently steerable to point in different directions.

8. The mooring system of claim 7, wherein the motors with propellers are each rotatable about vertical axes.

9. The mooring system of claim 2, wherein the motors with propellers are angled downwardly to add buoyancy to the array.

10. The mooring system of claim 1, wherein the array positioning system is powered from power generated by the solar array.

11. The mooring system of claim 2, wherein the array positioning system further comprises:
    (d) a motor speed controller that permits:
        different motors with propellers to be operated at different intensities from one another, and
        each of the motors with propellers to be operated at different intensities at different times.

12. The mooring system of claim 1, further comprising:
    (d) an inverter on the array for receiving DC power from the PV modules and converting the DC power to AC power such that any power received above an AC Power Limit would be clipped by the inverter; and
    (e) an energy management power control system configured to send power that has been clipped by the inverter to the motors with propellers.

13. The mooring system of claim 1, further comprising:
    (d) a plurality of mooring cables connected to the array.

* * * * *